(12) United States Patent
Saha et al.

(10) Patent No.: US 7,965,804 B2
(45) Date of Patent: Jun. 21, 2011

(54) METHOD OF LINK WORD SYNCHRONIZATION

(75) Inventors: Angshuman Saha, Sunnyvale, CA (US); Steven Farnworth, Menlo Park, CA (US); Russell R. Tuck, III, San Jose, CA (US); Deepak Mansharamani, San Jose, CA (US)

(73) Assignee: Pluris, Inc., Cupertino, CA (US)

( * ) Notice: Subject to any disclaimer, the term of this patent is extended or adjusted under 35 U.S.C. 154(b) by 218 days.

(21) Appl. No.: 12/498,757

(22) Filed: Jul. 7, 2009

(65) Prior Publication Data

US 2009/0276652 A1    Nov. 5, 2009

(51) Int. Cl.
*H04L 7/00* (2006.01)

(52) U.S. Cl. .................................................. 375/365

(58) Field of Classification Search .......... 375/356; 370/513
See application file for complete search history.

(56) References Cited

U.S. PATENT DOCUMENTS

| | | | | |
|---|---|---|---|---|
| 4,425,615 A | * | 1/1984 | Swenson et al. | 711/114 |
| 5,668,809 A | * | 9/1997 | Rostoker et al. | 370/392 |
| 6,064,679 A | * | 5/2000 | Hashemi et al. | 370/513 |
| 6,611,538 B1 | * | 8/2003 | Malerevich et al. | 370/503 |

* cited by examiner

*Primary Examiner* — Don N Vo
(74) *Attorney, Agent, or Firm* — Donald R. Boys; Central Coast Patent Agency, Inc

(57) ABSTRACT

A method for word synchronization can be applied to asynchronous devices including SERDES devices connected across serial lines. A state transition methodology characterizes the state of the device based on control characters received consistently across the serial lines and channels the system to a state of word synchronization. Loss of synchronization and transmission errors lead to a re-establishment of synchronization.

8 Claims, 2 Drawing Sheets

METHOD OF LINK WORD SYNCHRONIZATION

CROSS-REFERENCE TO RELATED APPLICATIONS

The present application is a continuation of application Ser. No. 09/418,119, filed on Oct. 14, 1999, which is now U.S. Pat. No. 7,570,724, which is incorporated herein in its entirety, at least by reference.

BACKGROUND OF THE INVENTION

1. Field of Invention

The present invention relates to a method for synchronization for use in data transmission and more particularly to a method for word synchronization that can be used in systems with multiple serial links.

2. Description of Related Art

The problem of word synchronization results in communications systems with multiple serial links where each link carries a portion of a word being transmitted. For example, a 64-bit word may be transmitted between two word devices as eight 8-bit bytes, the arrival of which must be synchronized so that the 64-bit word arrives correctly. In order to enable this synchronization in a robust way, requirements for handshaking go beyond what has been developed for a single serial link. For example, the Next Generation I/O Link Architecture Specification describes link establishment and maintenance handshaking together with an associated state machine but only for a single serial link. There is no generalization to the concept of word synchronization on multiple serial links. (NGIO Specification, Oct. 30, 1998, Intel Corporation; http://developer.intel.com/design/servers/future_server_io/ for an overview, and http://devloper.intel.com/design/servers/future_server_io/documents/ngiolas.pdf for the complete document.)

Likewise, Fibre Channel specifications provide link states and link establishment handshaking but only for a single serial link. (ANSI X3.230:1994, Fibre Channel Physical and Signaling Interface (FC-PH) Rev 4.3)

Only limited word synchronization has been developed for multiple serial devices. The Vitesse quad SERDES (serializer/deserializer) device provides the capability to synchronize multiple serial links but without any status, confirmation or link state handshake, features that are essential to a robust implementation. (Vitesse Quad SERDES VSC7216 specification; Vitesse Quad SERDES VSC7214 Specification: http://www.vitesse.com/summarysheets/vsc7214.htm.) For example, in the absence of handshaking, data may be sent without synchronization and errors may develop and go undetected.

There are many ways of encoding data to send it over a serial data link. The most widely used is an 8-bit to 10-bit encoding defined in the Fibre Channel PH Specification cited above. This encoding allows the receiver to recover a clock for sampling the data and to detect byte boundaries in the data. It also provides for the transmission of non-data control characters. While Fibre Channel defines a use for some control characters, they call be assigned other uses when the encoding is used separately from Fibre Channel. There are other less widely used encodings with similar features. These encodings, including that used by Fibre Channel and others, will be referred to hereinafter as FC-like serial encoding. A serializer or deserializer that uses an FC-like serial encoding will hereinafter be called a SERDES.

SUMMARY OF THE INVENTION

Accordingly, it is an object of this invention to provide a method of word synchronization in a system of word devices connected by multiple data links.

It is a further object of this invention to provide a method of word synchronization in a system of word devices connected by multiple data links that are otherwise independent and unsynchronized.

It is a further object of this invention to provide word synchronization in a system of word devices including SERDES devices connected by serial lines.

It is a further object of this invention to provide robust word synchronization in a system of word devices so that a loss of synchronization leads to a re-establishment of synchronization.

It is a further object of this invention to provide positive confirmation of word synchronization with each packet of data transmitted between two word devices.

It is a further object of this invention to minimize the number of overhead bytes transmitted between two word devices in addition to the data being transmitted.

The above and related objects are realized according to a first aspect of the present invention by a method for word synchronization between a first word device and a second word device. Initially the first word device and the second word device are each unsynchronized. The first word device and the second word device each include serializers and deserializers. The serializers of the first word device are connected to the deserializers of the second word device by multiple serial lines, and the serializers of the second word device are connected to the deserializers of the first word device by multiple serial lines. The method includes:

transmitting a synchronization request on the serial lines from the serializers of the first device to the deserializers of the second device;

becoming synchronized at the second device in response to the synchronization request from the first device;

transmitting a synchronization request on the serial lines from the serializers of the second device to the deserializers of the first device after the second device has become synchronized;

becoming synchronized at the first device in response to the synchronization request from the second device; and transmitting data on the serial lines from the serializers of the first device to the deserializers of the second device after the first device has become synchronized in response to the request for synchronization from the synchronized second device.

This aspect of the invention solves the problem of word synchronization between two communicating devices that are using multiple high-speed serial lines with clock information embedded in the data. Other approaches have been restricted to single serial links or to limited word synchronization. The present invention can be applied to systems with multiple high-speed serial lines. It will work in rugged environments where there is loss of power and cable failure. The present invention allows recovery from loss of synchronization due, for example, to trans-mission errors and leads to a return to word synchronization.

In a preferred embodiment the method also includes detecting loss of synchronization between the first and second devices and confirming synchronization with the transmission and reception of each packet of data. This allows the method to respond quickly to the loss of synchronization and to maintain an accurate status of the link.

These and other objects and advantages of the invention will become more apparent and more readily appreciated from the following detailed description of the presently preferred exemplary embodiment of the invention taken in conjunction with the accompanying drawings.

DETAILED DESCRIPTION OF THE PRESENTLY PREFERRED EXEMPLARY EMBODIMENT

Figure 1:
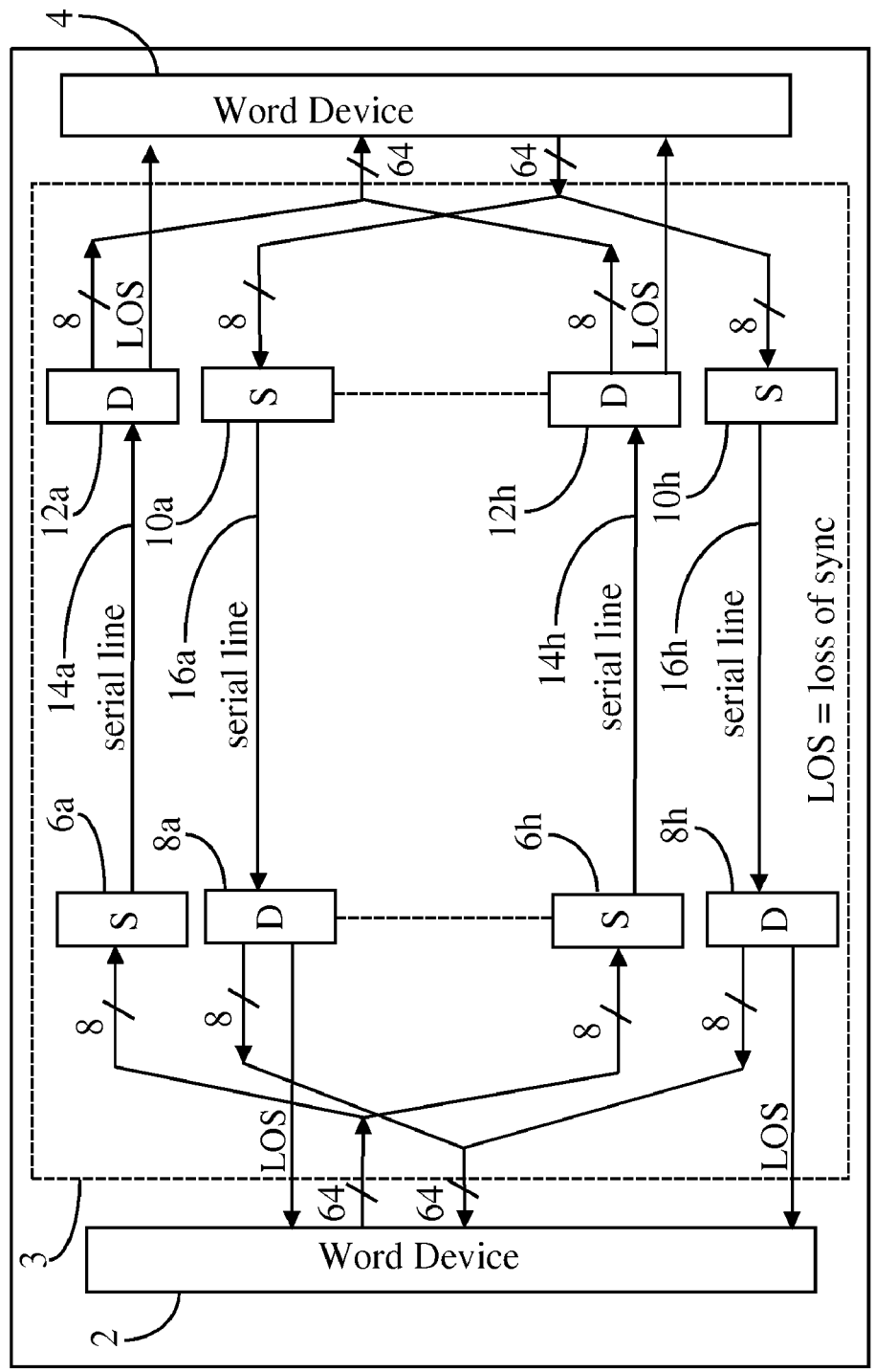
FIG. 1 is a diagram illustrating a SERDES system according to the present invention.

A preferred embodiment of the present invention provides a method of achieving word synchronization between two asynchronous devices connected by multiple serial links. As illustrated in FIG. 1, word devices 2 and 4 transfer data to one another on a 64-bit bi-directional link bus 3 preferably running at 125 Mhz. The data is actually transmitted via a set of eight SERDES (serializer/deserializer) devices, each of which converts 8 bits of parallel data to a bit-serial form in which data and clock are encoded in a single serial signal that is transmitted across a serial line. Correspondingly the data is received via a set of eight SERDES devices, each of which converts data in bit serial form to 8 bits of parallel data. Thus, in FIG. 1 word device 2 is connected to eight serializers 6a-6h for transmitting data and eight deserializers 8a-8h for receiving data. Likewise, word device 4 is connected to eight serializers 10a-10h for transmitting data and eight deserializers 12a-12h for receiving data. Transmission from device 2 to device 4 occurs across serial lines 14a-14h, and transmission from device 4 to device 2 occurs across serial lines 16a-16h.

Collectively, serial lines 14a-14h and 16a-16h are denoted as the fabric link (or simply the link between word devices 2 and 4. In the preferred embodiment serial lines 14a-14h and 16a-16h are optical links running at 1.25 Gb/sec; alternatively, the transmission may be electronic rather than optical. Additionally, ribbon fiber may be used to carry all of the serial lines in a single connector. Although FIG. 1 illustrates a case where the link consists of eight serial links (i.e., serial lines 14a-14h and 16a-16h), the method can be applied generally to a link consisting of N serial links. Although the method is described using serial links, it can be applied to any set of links that deliver data with different delays.

A single 64-bit data unit transmitted from device 2 or device 4 constitutes a word, that is, a 64-bit word. Each word must be correctly delivered to the other device in a single 64-bit unit. Accomplishing this requires synchronizing the arrival of the eight 8-bit bytes. When this synchronization is in effect, the link (including serial links 14a-14h and 16a-16h) is word synchronized.

Figure 2:
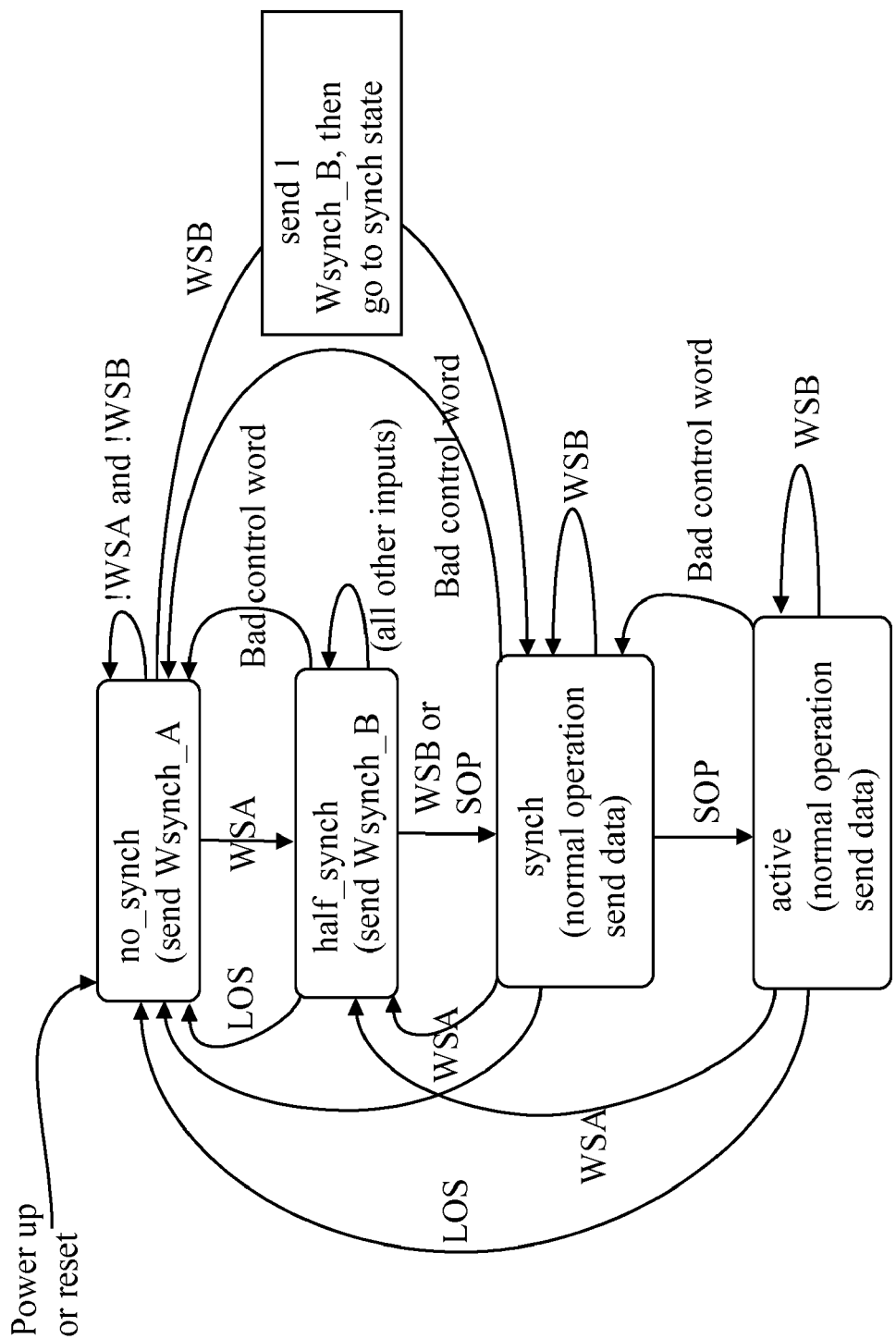
FIG. 2 is state transition diagram according to the present invention.

SERDES devices 6a-6h, 8a-8h, 10a-10h, and 12a-12h are consistent with the specifications of Vitesse Quad SERDES devices (e.g., VSC7214/VSC7215). These SERDES devices are able to transmit a special sequence of Idle characters, synchronized and in parallel on multiple serial links. Upon receiving such a sequence on multiple serial links, these SERDES devices are capable of synchronizing the serial lines so that bytes simultaneously input to the transmitting SERDES devices (e.g., 6a-6h) are then simultaneously output from the receiving SERDES devices (e.g., 12a-12h). This feature makes it possible to achieve word synchronization. However, SERDES devices 6a-6h, 8a-8h, 10a-10h, and 12a-12h do not include a mechanism for indicating whether a link between two word devices is word synchronized. Furthermore, when such a link is not word synchronized, there is no mechanism for requesting from one end of the link to the other that the special synchronization-enabling Idle sequence be sent. Each of SERDES devices 6a-6h, 8a-8h, 10a-11h, and 12a-12h does have error signals for data errors signals loss of byte synchronization on the receiving end of a serial link. Although the presence of these error signals does indicate the loss of word synchronization, their absence does not imply word synchronization. FIG. 2 illustrates the ability of receiving SERDES devices 8a-8h and 12a-12h to send a loss of synchronization (LOS) signal to word units 2 and 4 respectfully.

A word link between two word devices must establish word synchronization in both directions before it can operate normally. If word synchronization is lost, it must be reestablished before normal operations can resume. Word synchronization requires that all the serial links that comprise the fabric link are working in unison to correctly deliver each 64-bit word intact (i.e., all bytes delivered in the same clock cycle). In order to accomplish word synchronization between devices 2 and 4, several operations must be carried out in a coordinated way as each word device operates as a transmitter or as a receiver for a 64-bit word. Acting as a transmitter, a device must send a data stream that enables the corresponding receiver to establish word synchronization. Acting as a receiver, a device must detect when word synchronization has been established or lost, notify a corresponding transmitter when there is no word synchronization, and request from a corresponding transmitter that a sequence to enable word synchronization be sent.

Synchronization is achieved between devices 2 and 4 according to the state transition diagram of FIG. 2. The possible link states for devices 2 and 4 are described in Table 1: no_synch, half_synch, synch, and active. As indicated in FIG. 2 in parentheses for each state, the device output sequence associated with each state is transmitted across the link to the device thereby connected (e.g., from device 2 to device 4). The possible device output sequences (i.e., sequences of words) are described in Table 2. Wsynch_A denotes a sequence of sixteen idles followed by WSA, a defined control character. Wsynch_B denotes a sequence of sixteen idles followed by WSB, a defined control character. In addition to these output sequences specifically used to coordinate word synchronization, output can include properly formatted packets and idles.

Control words for the system illustrated in FIG. 1 and FIG. 2 are defined in terms of the control characters specified for a single SERDES device. An enumeration of defined control characters is given in Table 3. WSA and WSB are control characters defined by the SERDES device to achieve byte synchronization. SERDES packet sequencing is facilitated by control characters for start of packet (SOP), end of packet (EOP), plus end and start of packet (ESOP). SERDES devices also use Idle characters to maintain byte synchronization and Abort characters to abort a packet. For any of these control characters, the corresponding control word is that control character repeated across each serial line. In FIG. 2, a bad control word denotes a properly formatted control word where the bytes are not identical across each serial line. Additionally a control word to denote loss of synch (LOS) effectively results from an LOS signal from any SERDES as illustrated in FIG. 1.

As illustrated in FIG. 2, state transitions are associated with receipt of a control word (or an error in a control word). State transition arrows in FIG. 2 are labeled with control word inputs that cause that state change; inputs that do not cause a state change are not shown.

When a word device (e.g., device 2 or 4) is in the no_synch state, this indicates that the receiver at this end of the link does not have word synch. That is, the device is not prepared to synchronously receive 64-bit words. This is the default state when the device is first powered up. The output generated, which is a request for word synchronization, is Wsynch_A, a 16-word sequence of idles followed by the control word WSA. This 17-word output sequence is sent repeatedly as long as the device remains in the no_synch state. When the device receives control word WSA it switches to the half_synch state. When the device receives control word WSB, it sends the control sequence Wsynch_B and then switches to the synch state. The no_synch state is reached whenever the device detects loss of synch (LOS).

When a word device is in the half_synch state, this indicates that the device at this end of the link has word synch so that the device at the other end of the link may begin sending packets. However, there is no confirmation that the device at the other end of the link has word synch. The output generated is Wsynch_B, a 16-word sequence of idles followed by the control word WSB. This 17-word output sequence is sent repeatedly as long as the device remains in the half_synch state. It enables the device at the other end of the link to become synchronized, and notifies that device that this device has achieved word synchronization. When the device receives control words WSB or SOP, it switches to the synch state. When the device receives control word LOS or a bad control word, it switches to the no_synch state. The half_synch state is reached whenever the device receives WSA.

When a word device is in the synch state, devices at both ends of the link have word synch, and packets can be sent in either direction. In this state the device sends available packets of data across the link. However, the link is not in confirmed good state either because no packet has been received at this end yet or because a bad control word has been received. (Receipt of a bad control word indicates a possible loss of word synch.) When the device receives control word SOP, it switches to the active state. When the device receives control word WSA, it switches to the half_synch state. When the device receives control word LOS or a bad control word, it switches to the no_synch state.

When a word device is in the active state, the link is in a confirmed state of word synch in the sense that both ends have word synch and the last SOP received was good. In this state the device sends available packets of data across the link. When the device receives a bad control word, it switches to the synch state. When the device receives control word LOS or a bad control word, it switches to the no_synch state.

For example, assume word devices 2 and 4 are reset simultaneously so that each device is put into the no_synch state. Further assume that devices 2 and 4 are capable of normal (i.e., error-free) operation after this reset. Then each device outputs Wsynch_A. Each device then receives control word WA and is put into the half_synch state so that each device outputs Wsynch_B. Each device then receives control word WB and is put into the synch state so that each device begins sending normal data, which includes the control word SOP at the start of a packet. Each device then receives control word SOP and is put into active state and continues sending normal data.

Next assume that just device 2 is reset so that device 2 is put into the no_synch state while device 4 is in the active state. Device 2 outputs Wsynch_A while device 4 is sending normal data. Device 4 then receives WSA and is put into the half synch state so that it outputs Wsynch_B. When device 2 receives WSB, it is put into the half_synch so that it outputs Wsynch_B. Then, as discussed above, devices 2 and 4 can both proceed from the half synch state to the synch state and then to the active state.

Similarly, if devices 2 and 4 are in the active state and the transmission is disrupted by a loss of synch (LOS) or a bad control word, then devices 2 and 4 can both return to the active state with confirmed word synchronization and normal transmission of data. The present invention robustly enables word synchronization by confirming the synchronization of the transmission after a disruption and the subsequent resumption of normal operations.

Preferably the method, as illustrated by the state transition diagram of FIG. 2, is implemented as an ASIC (Application-Specific Integrated Circuit) that maintains the states of word devices 2 and 4 and controls their output. However, the method may also be implemented by other means including a general-purpose computing device although such an implementation may be undesirably slow.

Preferably, the fabric link does include a CPU (Central Processing Unit) that can be used for monitoring the status of the link. This CPU may receive a maskable interrupt whenever the link enters the no_synch state, and possibly also the half_synch state. These features enable the local CPU to monitor the state of the link in order to take appropriate action when the status of the link changes, thereby diagnosing and working around link failures and directing data traffic toward or away from the link as appropriate. The capability to monitor the status of the link and to diagnose and resolve failures is especially desirable when the method is applied in complex networks with multiple word devices.

When a word device is in the synch state or the active state, additional aspects of the method enable the confirmation of synchronization with the transmission and reception of each packet of data so that a loss of synchronization manifests itself by the receipt of one or more bad control words. For example, according to the details of a network implementation, a designated control word (e.g., SOP) may be preceded and followed by some specified number of words including idles, data, and other control words, but not the same designated control word. By not allowing any two copies of this control word to be sent without some minimal number of other intervening words, it can be ensured that the receiver only receives that control word when word synchronized. If the receiver were not synchronized, it could mix bytes of the designated control word with other nearby words, but no such mixing could produce a copy of the designated control word because of the separation required in the sending of these words. Therefore, reception of the designated control word is positive confirmation of link synchronization. It is possible to have more than one such control word.

More generally, the use of control characters only as elements of properly formed control words provides defection of loss of synchronization even in the absence of a required minimal separation between repeated control words. That is, a properly formed control word includes the same control character on each serial line, where that control character is only used in this way. If any of these characters is ever received without being part of a corresponding control word, then this receipt of a bad control word is either the result of a loss of synchronization or a data error.

Data errors are generally transient, and so their repeated detection over a short time interval indicates a probable loss of synchronization. For example, according to the preferred embodiment shown in FIG. 2, when a word device in the active state receives a first bad control word, the device transitions to the synch state. From the synch state, receipt of a second bad control word results in a transition to the no_synch state; however, receipt of an SOP control word without errors returns the device to the active state. Thus, according to the preferred embodiment, a loss of synchronization results from the receipt of two bad control words without an intervening SOP control word, which indicates the synchronized transmission of data. This principle can be generalized, for example, by counting the number of received bad control words up to some threshold before transitioning from the synch state to the no_synch state. In this way, the invention allows for a faster recovery from transient data errors at the expense of a reduced sensitivity to a loss of synchronization.

Using control words to confirm synchronization according to the present invention is consistent with their functional use in data transmission. In the preferred embodiment, suitable control words defined by identical control characters across each serial line are used as framing indicators, including (from Table 3): SOP (start of packet), EOP (end of packet), and ESOP (end and start of packet). These allow confirmation of link synchronization at the start and end of every packet received. The control characters used in these control words are not used for any other purpose, so these control words also enable the detection of a loss of synchronization.

Although only a single exemplary embodiment of this invention has been described in detail above, those skilled in the art will readily appreciate that many modifications are possible in the exemplary embodiment without materially departing from the novel teachings and advantages of this invention. Accordingly, all such modifications are intended to be included within the scope of this invention.

TABLE 1

Link State Definitions

| State | Description |
|---|---|
| no_synch | Receiver at this end of link does not have word synch. |
| | This is the default state on power up and reset. |
| | Device sends Wsynch_A sequence to request word synchronization. |
| | Device switches to half_synch state when it receives control word WSA. |
| | Device sends Wsynch_B and switches to synch state when it receives control word WSB. |
| | Device goes to this state whenever it detects loss of word synch (LOS). |
| half_synch | Receiver at this end of link has word synch. |
| | Device at the other end of link may begin sending packets. |
| | Device sends Wsynch_B sequence to request word synchronization. |
| | Device switches to synch state when it receives control words WSB or SOP. |
| | Device switches to no_synch state when it receives control word LOS or a bad control word. |
| | Device goes to this state whenever it receives WSA. |
| synch | Receivers at both ends of the link have word synch |
| | Packets can be sent in either direction. However, the link is not in confirmed good state either because no packet has been received at this end yet or because a bad control word has been received. (Receipt of a bad control word indicates a possible loss of word synch.) |
| | Device switches to active state when it receives control word SOP. |
| | Device switches to half_synch state when it receives control word WSA. |
| | Device switches to no_synch state when it receives control word LOS or a bad control word. |
| active | Link is in a confirmed state of word synch: both ends have word synch and last SOP received was good. |
| | Device switches to synch state when it receives a bad control word. |
| | Device switches to no_synch state when it receives control word LOS or a bad control word. |

TABLE 2

Output Sequences

| Output | Description |
|---|---|
| Wsynch_A | Special sequence of sixteen idles followed by WSA. |
| Wsynch_B | Special sequence of sixteen idles followed by WSB. |
| data (normal op) | Properly framed packets and idles. |

TABLE 3

SERDES Control Character Definitions

| Control Char. Name | Comment | Can legally follow these: | Can legally precede these: |
|---|---|---|---|
| WSA—Word Synch A | WSA is sent to request a word synch sequence when word synch is lost | Word synch enabling Idle sequence. | Word synch enabling Idle sequence. |
| WSB—Word Synch B | WSB is sent to indicate the ability to accept packets and to facilitate attaining word synch when a receiver has word synch but the receiver at the other end might not. | Word synch enabling Idle sequence. | Idle, SOP. |
| SOP—Start of Packet | SOP identifies the start of a packet. | WSB, Idle, EOP. | Packet, starting with fabric header. |
| EOP—End of Packet | EOP identifies the end of packet | Packet, ending with CRC. | Idle, SOP. |
| ESOP—End and Start of | ESOP separates back-to-back packets thereby | Packet. | Packet. |

TABLE 3-continued

SERDES Control Character Definitions

| Control Char. Name | Comment | Can legally follow these: | Can legally precede these: |
|---|---|---|---|
| Packet | replacing EOP-SOP control word sequence. | | |
| Idle | Idles are periodically required by SERDES to maintain byte and word synch. Idles can be sent before SOP, after EOP, and after WSB. | Word synch enabling Idle sequence, WSA. | Word synch enabling Idle sequence, WSA, WSB. |
| Abort | Abort is sent to terminate the transmission of a packet. When, sent within a packet (i.e., between SOP and EOP, or equivalently with ESOP), Abort causes the packet it interrupts to be dropped (or delivered to a CPU that has requested back packets). When sent between packets, it has no effect. Implementations may (but are not required to) consider Abort to be a bad control word, so more than one Abort without an intervening SOP may cause the link to revert to no_synch state. | Anything except WSA. | Idle, SOP. |

What is claimed is:

1. A system for synchronously transmitting in one direction digital words of a specific bit-length, comprising:
a first digital device;
a second digital device;
a set of parallel conductors connecting the first digital device and the second digital device;
a plurality of serializers in the first digital device, one coupled to each parallel conductor;
a plurality of deserializers in the second digital device, one coupled to each parallel conductor;
first software or firmware implemented at the first digital device; and
second software or firmware implemented at the second digital device;
wherein, prior to transmitting digital words of the specific bit length, the first software or firmware transmits to the second digital device an enabling idle sequence, including a first control word, simultaneously on each parallel conductor, enabling the second digital device to synchronously receive and deserialize words at the second digital device, and upon synchronization, the first software or firmware serially divides digital words to be transmitted to the second digital device into equal length portions, and transmits each portion separately but simultaneously on a dedicated one of the parallel conductors, the equal length portions received and deserialized back into the original digital word by the deserializers at the second digital device.

2. The system of claim 1 further comprising deserializers at the first digital device and serializers at the second digital device, each coupled to individual ones of the parallel conductors, and wherein, after synchronization at the second digital device for transmissions from the first digital device, the second digital device transmits to the first digital device an enabling idle sequence, including a second control word, simultaneously on each parallel conductor, enabling the first digital device to synchronously receive and deserialize words from the second digital device, completing a synchronization sequence, and upon synchronization at both the first and the second digital device, digital words of the specific bit length are divided and transmitted synchronously in both directions.

3. The system of claim 2 wherein digital words transmitted comprise data packets, and the software or firmware at each digital device, recognizing beginning and end of packets, transmit at least one control word on each parallel conductor simultaneously.

4. The system of claim 3 wherein the software or firmware at each digital device, recognizing an inconsistency of control words sent between packets, suspends transmission of packet data and repeats the synchronization sequence.

5. A method for synchronously transmitting in one direction digital words of a specific bit-length, comprising the steps of:
(a) prior to transmitting digital words of the specific bit length, transmitting by a first software or firmware at a first digital device to a second digital device an enabling idle sequence, including a first control word, simultaneously on each of a plurality of parallel conductors between the two digital devices, enabling software or firmware at the second digital device to synchronously receive and deserialize words at the second digital device; and
(b) upon synchronization, serially dividing, at the first digital device digital words to be transmitted to the second digital device into equal length portions, and transmitting each portion separately but simultaneously on a dedicated one of the parallel conductors, the equal length portions received and deserialized back into the original digital word by deserializers coupled to the parallel conductors at the second digital device.

6. The method of claim 5 further comprising a step for transmitting, after synchronizing from the first digital device to the second digital device, an enabling idle sequence including a second control word control word from the second digital device to the first digital device simultaneously on each of the plurality of parallel conductors between the two digital devices, enabling software or firmware at the first digital device to synchronously receive and deserialize words at the first digital device, whereupon words may be transmitted synchronously in both directions.

7. The method of claim 6 wherein digital words transmitted comprise data packets, and the software or firmware at each digital device, recognizing beginning and end of packets, transmit at least one control word on each parallel conductor simultaneously.

8. The method of claim 7 wherein the software or firmware at each digital device, recognizing an inconsistency of control words sent between packets, suspends transmission of packet data and repeats the synchronization sequence.

* * * * *